(12) United States Patent
Golda et al.

(10) Patent No.: US 12,728,542 B2
(45) Date of Patent: Sep. 8, 2026

(54) CONTROLLING ROBOTIC DEVICES TO PERFORM TASKS

(71) Applicant: Tacta Systems Inc., Palo Alto, CA (US)

(72) Inventors: Dariusz Golda, Portola Valley, CA (US); Harry Zhe Su, Union City, CA (US); Darshan Hegde, San Mateo, CA (US); Qingkai Lu, Sunnyvale, CA (US)

(73) Assignee: Tacta Systems Inc., Palo Alto, CA (US)

( * ) Notice: Subject to any disclaimer, the term of this patent is extended or adjusted under 35 U.S.C. 154(b) by 0 days.

(21) Appl. No.: 19/091,410

(22) Filed: Mar. 26, 2025

(65) Prior Publication Data

US 2026/0091508 A1 Apr. 2, 2026

Related U.S. Application Data

(60) Provisional application No. 63/701,346, filed on Sep. 30, 2024.

(51) Int. Cl.
*B25J 13/08* (2006.01)
*B25J 9/16* (2006.01)
*B25J 15/00* (2006.01)

(52) U.S. Cl.
CPC ............. *B25J 13/082* (2013.01); *B25J 9/163* (2013.01); *B25J 9/1633* (2013.01); *B25J 15/0009* (2013.01)

(58) Field of Classification Search
CPC ........ B25J 13/082; B25J 9/163; B25J 9/1633; B25J 15/0009

(Continued)

(56) References Cited

U.S. PATENT DOCUMENTS 4,957,320 A * 9/1990 Ulrich .................. B25J 15/0009 294/111
8,754,862 B2 * 6/2014 Zaliva ................ G06F 3/04166 345/173

(Continued)

FOREIGN PATENT DOCUMENTS

CN 105818129 A 8/2016
CN 116330289 A 6/2023

(Continued)

OTHER PUBLICATIONS

"Learning the signatures of the human grasp using a scalable tactile glove," Subramanian Sundaram, Petr Kellnhofer, Yunzhu Li, Jun-Yan Zhu, Antonio Torralba & Wojciech Matusik; Nature, vol. 569; May 30, 2019; https://doi.org/10.1038/s41586-019-1234-z; 19 pages.

(Continued)

*Primary Examiner* — Jaime Figueroa
(74) *Attorney, Agent, or Firm* — Aikin & Gallant, LLP

(57) ABSTRACT

A method for controlling a robotic device to perform a task may include determining a force measurement corresponding to a section of sensors coupled with a digit of a plurality of digits of a robotic device. The force measurement may include a magnitude of a force and a position of a centroid of the force in the section that are determined based on contact with an object corresponding to a time. The method may further include determining a digit position of the digit corresponding to the time, and moving the digit, based on a prediction, to stabilize the object to perform a task. A machine learning model can generate the prediction based on the force measurement and the digit position. Other aspects are also described and claimed.

20 Claims, 10 Drawing Sheets

(58) Field of Classification Search
USPC ................. 700/245–264; 318/568.11–568.25
See application file for complete search history.

(56) References Cited

U.S. PATENT DOCUMENTS

| | | | | |
|---|---|---|---|---|
| 10,058,995 | B1 * | 8/2018 | Sampedro | B25J 9/163 |
| 10,089,575 | B1 * | 10/2018 | Redmon | G06N 3/08 |
| 10,318,008 | B2 * | 6/2019 | Sinha | G06V 20/653 |
| 10,981,272 | B1 * | 4/2021 | Nagarajan | B25J 9/1669 |
| 11,009,949 | B1 | 5/2021 | Elias et al. | |
| 11,148,299 | B2 | 10/2021 | Yui | |
| 11,262,797 | B1 | 3/2022 | Hoen et al. | |
| 11,400,587 | B2 | 8/2022 | Holly et al. | |
| 11,413,748 | B2 | 8/2022 | Colasanto et al. | |
| 11,440,183 | B2 | 9/2022 | Huang et al. | |
| 11,460,919 | B1 | 10/2022 | Gashler et al. | |
| 11,534,923 | B1 | 12/2022 | De Arruda Camargo Polido | |
| 12,493,792 | B2 * | 12/2025 | Tremblay | G06N 3/084 |
| 2009/0132088 | A1 | 5/2009 | Taitler | |
| 2012/0007821 | A1 * | 1/2012 | Zaliva | G06F 3/04166 345/173 |
| 2013/0345875 | A1 | 12/2013 | Brooks et al. | |
| 2015/0314439 | A1 | 11/2015 | Wang et al. | |
| 2018/0056520 | A1 | 3/2018 | Ozaki et al. | |
| 2019/0308333 | A1 | 10/2019 | Chen et al. | |
| 2019/0314998 | A1 | 10/2019 | Yui | |
| 2020/0306980 | A1 * | 10/2020 | Choi | B25J 9/1697 |
| 2020/0311956 | A1 * | 10/2020 | Choi | G06V 10/454 |
| 2021/0125052 | A1 | 4/2021 | Tremblay et al. | |
| 2021/0315485 | A1 | 10/2021 | Matusik et al. | |
| 2024/0300095 | A1 | 9/2024 | Agarwal et al. | |

FOREIGN PATENT DOCUMENTS

| | | | |
|---|---|---|---|
| CN | 118596148 | A | 9/2024 |
| JP | 2019181622 | A | 10/2019 |
| JP | 2021192944 | A | 12/2021 |
| KR | 10-2013-0017123 | A | 2/2013 |

OTHER PUBLICATIONS

"Tactile and Vision Perception for Intelligent Humanoids," Shuo Gao, Yanning Dai, & Arokia Nathan; Adv. Intell. Syst. 2022, 4, 2100074; Advanced Intelligent Systems published by Wiley-VCH GmbH; DOI: 10.1002/aisy.202100074; 28 pages.

Learning Hand-Eye Coordination for Robotic Grasping with Deep Learning and Large-Scale Data Collection, Sergey Levine, Peter Pastor, Alex Krizhevsky & Deirdre Quillen; arXiv:1603.02199v4 [cs.LG] Aug. 28, 2016; 12 pages.

Learning Object Manipulation with Dexterous Hand-Arm Systems from Human Demonstration, Philipp Ruppel & Jianwei Zhang; 2020 IEEE/RSJ International Conference on Intelligent Robots and Systems (IROS); Oct. 25-29, 2020; Las Vegas, NV, USA (Virtual); DOI: 10.1109/IROS45743.2020.9340966; 8 pages.

Notification of the Transmittal of the International Search Report and the Written Opinion of the International Searching Authority, or The Declaration, received for PCT Patent Application No. PCT/US25/46898, mailed Jan. 13, 2026, 8 pages.

* cited by examiner

CONTROLLING ROBOTIC DEVICES TO PERFORM TASKS

RELATED APPLICATIONS

This patent application claims the benefit of priority of U.S. Provisional Application No. 63/701,346, filed Sep. 30, 2024, which is incorporated herein by reference in its entirety.

BACKGROUND

Field

This disclosure relates generally to robotic systems and, more specifically, to utilizing machine learning to control robotic devices to perform tasks with objects. Other aspects are also described.

Background Information

A robotic device, or robot, may refer to a machine that can automatically perform one or more actions or tasks in an environment. For example, a robotic device could be configured to assist with manufacturing, assembly, packaging, maintenance, cleaning, transportation, exploration, surgery, or safety protocols, among other things. A robotic device can include various mechanical components, such as a robotic arm and an end effector, to interact with the surrounding environment and to perform the tasks. A robotic device can also include a processor or controller executing instructions stored in memory to configure the robotic device to perform the tasks.

SUMMARY

Implementations of this disclosure include utilizing sections of sensors coupled with digits of a robotic device, and condensing large data sets generated by the sensors, to enable a machine learning model to predict movements of the digits to stabilize and move objects to perform a task. In some implementations, the machine learning model may be trained based on performance of the task with a demonstration object, such as by using a demonstration device that includes sensors corresponding to the robotic device. The data sets may be generated by the sensors in frames or time stamps at a given frequency. The data sets may be compressed by processing the data to determine force measurements (comprised of a magnitude and a centroid of a force normalized in a section) and digit positions. The machine learning model can then utilize encoders to extract features from the compressed data sets, and from target data, to produce vector data representations. A concatenator can merge the vector data representations into a single, unified vector representation on which the model can operate. A multilayer activation network can generate predictions (inferences) based on the unified vector representation. A decoder to generate next digit positions based on the predictions to control the digits to stabilize the object and move the object to perform the task.

Some implementations may include a method for controlling a robotic device to perform a task, including: determining a force measurement corresponding to a section of sensors coupled with a digit of a plurality of digits of a robotic device, wherein the force measurement includes a magnitude of a force and a position of a centroid of the force in the section that are determined based on contact with an object corresponding to a time; determining a digit position of the digit corresponding to the time; and moving the digit, based on a prediction, to stabilize the object to perform a task, wherein a machine learning model generates the prediction based on the force measurement and the digit position.

Some implementations may include a system utilized to perform a task, including: a robotic device having a plurality of digits, each digit having a section of sensors; and one or more processors executing instructions stored in memory to: determine a force measurement corresponding to a section of a digit of the plurality of digits, wherein the force measurement includes a magnitude of a force and a position of a centroid of the force in the section that are determined based on contact with an object corresponding to a time; determine a digit position of the digit corresponding to the time; and move the digit, based on a prediction, to stabilize the object to perform a task, wherein a machine learning model generates the prediction based on the force measurement and the digit position. Other aspects are also described and claimed.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure herein are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
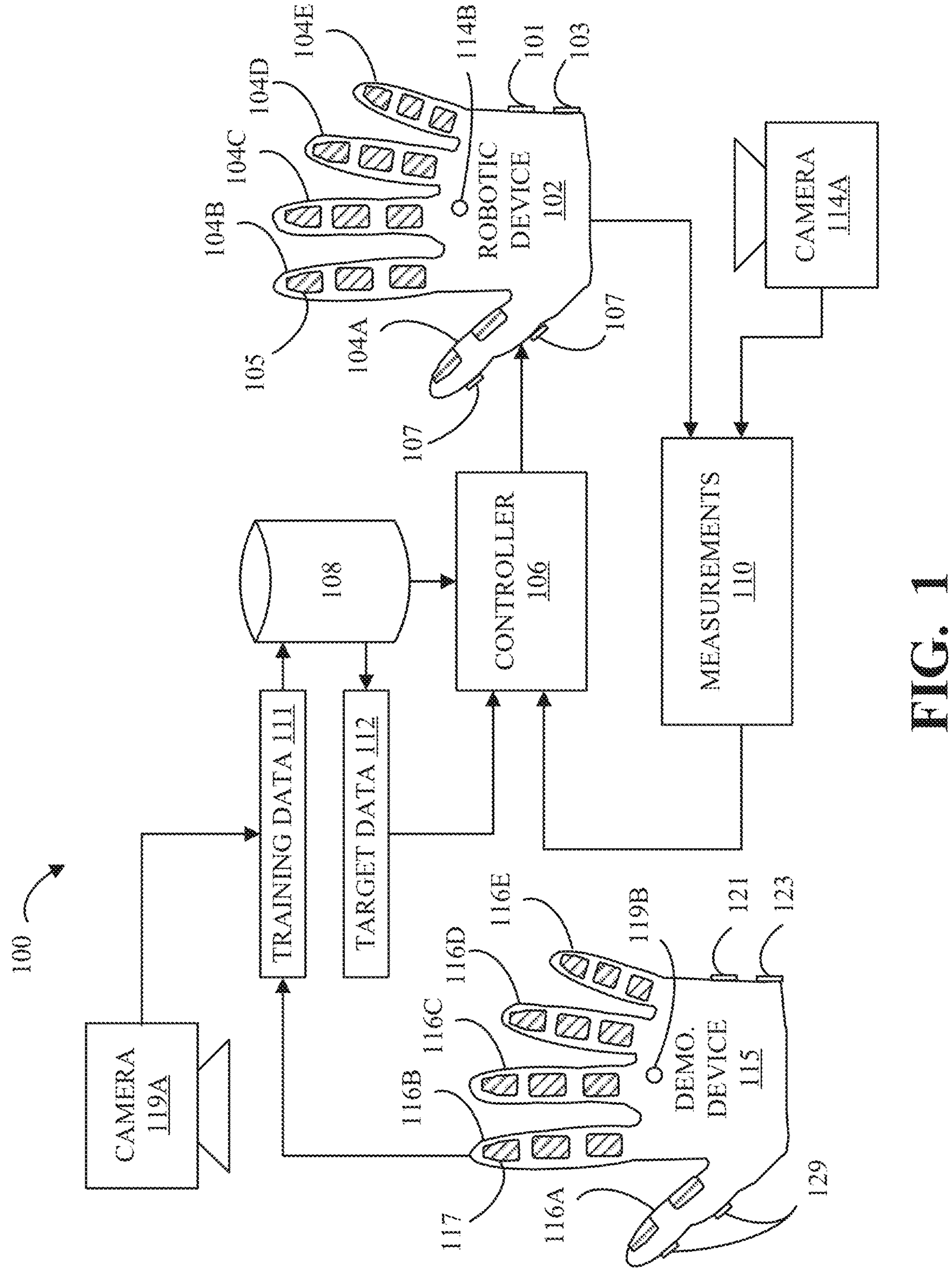
FIG. 1 is an example of system for controlling robotic devices to perform tasks.

Robotic devices may have difficulty performing the various fine detail work that humans can perform. For example, certain manufacturing or assembly tasks may involve the precision handling of discrete components and/or fine manipulation of small tools in relation to small targets (e.g., smaller than the human hand). While humans routinely manage these tasks, robotic devices may struggle with them. As a result, robotic devices are traditionally utilized for less detailed work, such as picking and placing larger objects, manipulating larger items, and other coarse work. Moreover, robotic devices may have difficulty perceiving changes that may occur when performing tasks. For example, while a robotic device can be programmed to perform a task in a particular way, such as picking up an object, when a change in state occurs, such as the object slipping, the robotic device may struggle to complete the task.

Implementations of this disclosure address problems such as these by utilizing sections of sensors (e.g., micro sensors) coupled with digits of a robotic device (e.g., a robotic hand with fingers/thumbs, and tactile arrays or patches coupled with the fingers/thumbs), and by condensing large data sets generated by the sensors (e.g., tactile maps), to enable a machine learning model to predict movements (e.g., to achieve positions, orientations, and/or applied forces) of the digits to stabilize and move objects to perform a task. For example, the task may include picking up or grasping an electrical connector and installing it in an electrical system. In some implementations, the machine learning model may be trained based on performance of the task with a demonstration object, such as by using a demonstration device (e.g., a sensing glove) that includes sensors corresponding to the robotic device. The data sets may be generated by the sensors in frames or time stamps at a given frequency (e.g., 60 Hz). The data sets may be compressed by processing the data to determine force measurements (comprised of a magnitude and a centroid of a force normalized in a section) and digit positions (comprised of joint angles of digits). The machine learning model can then: 1) utilize encoders to extract features from the compressed data sets and from target data to produce vector data representations of each, 2) a concatenator to merge the vector data representations into a single, unified vector representation on which the model can operate, 3) a multilayer activation network to generate predictions (inferences) based on the unified vector representation, and 4) a decoder to generate next digit positions, based on the predictions, to control the digits to stabilize the object and move the object to perform the task. As a result, the robotic device can perform fine detailed tasks with objects quickly and efficiently.

In some implementations, a system can utilize tactile force vector control methodology to combine tactile maps with a machine learning model to adjust digit positions (e.g., robotic thumb/fingers) and resulting contact forces on an object during an assembly task. For example, a user can demonstrate a task to a robotic system, such as utilizing a sensing glove to grasp and install a component such as an electrical connector in an electrical system. As the user contacts the component with two fingers through the tactile arrays, a force distribution at each frame or time stamp can be measured and recorded for the duration of the task, e.g., holding and inserting the component to complete a connector task.

The magnitude of the force and the position of its centroid within the tactile array can be determined from a distribution of tactile force measurements, compressing the array of measurements (M×N) into 3 values: force magnitude (F), and position (X, Y), within the array. The centroid and magnitude may be calculated for each tactile array onto which a force is applied. Finger positions of the user versus time may also be recorded and time-synchronized to the tactile maps, and the data may be provided to the machine learning model to train finger position to tactile force components for the entirety of the recorded task. The trained model can then be used to control the robotic system to adjust finger positions (or joint angles) based on input force magnitude and centroids for each section of sensors (or contact patch, or simply patch). Based on forces acting on the object satisfying a static equilibrium state (equilibrium), the machine learning model can adjust finger/thumb (digit) positions to maintain the static equilibrium for the duration of the task.

In some implementations, temporal input signals for a task used by the machine learning model may include: 1) a force magnitude and centroid for each tactile sensor array that includes a sensor indicating a non-zero value, 2) centroid coordinates of the force the section, and 3) digit positions of the demonstration device. These signals may be recorded for the entirety of a task, for multiple repeats of the task.

In some implementations, the machine learning model may be comprised of separate encoder blocks for each input stream (e.g., force magnitude, centroid coordinate, and finger/thumb or digit position). The encoder can pass embedded actions to the concatenator to merge the individual vectors into a unified vector representation. The unified vector representation can then pass into a multilayer activation network, followed by decoding into values to command actuator or motor outputs to digits of the robotic device.

As a result, an entire time sequence of a task (e.g., magnitudes $F_i$ (t), centroids ($X_i$ (t), $Y_i$ (t)), and digit positions Θ (t)) may comprise a reduced order representation of the task, e.g., an encoding of the physical forces and motions to perform the task. The machine learning model can determine temporal patterns and predict next actions to maintain a learned correlation of input motions to measured forces. For example, the machine learning model, based on temporal pattern matching, can benefit from a reduction of input space from M×N×k, where k is the number of frames or time stamps, and M×N is the size of the tactile array, to 3×k for magnitude and centroid coordinate. This may enable the robotic device to perform the task quickly and efficiently.

FIG. 1 is an example of system 100 for controlling a robotic device 102 to perform a task with an object. For example, the robotic device 102 may be controlled to pick up or grasp a component, such as an electrical connector, and install it in another system. The robotic device 102 may include a plurality of digits coupled with a robotic hand or base, such as digits 104A-104E corresponding to a robotic thumb and four robotic fingers. The digits may include joints that move at joint angles to achieve various degrees of freedom (DOF), such as metacarpophalangeal (MCP), distal interphalangeal (DIP), and/or proximal interphalangeal (PIP) joints providing various DOF. The robotic hand may be further coupled with a robotic arm that also includes joints that move at angles to achieve further DOF.

The robotic device 102 may also include a sensor array coupled thereto, corresponding to the sensor array coupled to a demonstration device 115. The sensor array may include i) tactile sensors arranged in sensor sections 105 coupled to digit sections of digits (e.g., palmar side of digits), and ii) motion sensors 107 coupled to digits of digit sections (e.g., one or more motion sensors per sensor section, arranged inside of digits). For example, the digits 104A-104E may include sections 105 of sensors 120, or tactile arrays, or contact patches, or simply patches, coupled with each digit. The sections 105 may be arranged between the tip and joints of the digits. For example, digit 104A (a first digit) may be a robotic thumb with two sections 105 between the tip and two joints, and digits 104B-104E (second, third, fourth, and fifth digits, respectively) may be robotic fingers with three sections 105 between the tip and three joints each. Each section may include a plurality of sensors arranged in the sensor array, such as force sensors (e.g., piezoelectric sensors) in a tactile array for sensing normal and/or shear forces based on contact with objects.

Each section may enable tactile sensing similar to human sensing. For example, each section may include a plurality of sensors 120 (e.g., tactile sensors) arranged in a grid, or rows and columns. A sensor 120 may be submillimeter in at least one in-plane dimension (e.g., a dimension of its footprint), to obtain a high spatial resolution measurements that are less than 2 millimeters (mm) apart, and in some cases, less than 1 mm apart. The sensors 120 may enable single mode or multimodal tactile sensing in a section. For example, each sensor 120 may be configured for sensing either a normal force, shear force, vibration, temperature, proximity, or image, operating as a force sensor, vibration sensor, temperature sensor, proximity sensor, and/or image sensor, respectively, so that a group of sensors in a section (single or multimodal) can sense one or more conditions based on contact with objects. Each sensor 120 may include, for example, a piezoelectric element (e.g., for sensing the normal force, shear force, vibration, temperature, or proximity, as configured), photo sensitive element (e.g., for sensing the image), and/or digital readout circuitry to send tactile signals (e.g., a charge amplifier, transistors, and/or buffering, indicating the multimodal sensing). Each motion sensor 107 may comprise, for example, a joint position encoder or other motions sensing device and/or a joint torque sensor or other force/torque sensing device corresponding to the tactile sensing indicated by the tactile signals from the tactile sensors. Each motion sensor 107 may be kinematically coupled to a global position of the sensor array to enable determining positions of the tactile sensing (e.g., determining 3D positions of 1D forces or 3D force vectors corresponding to contact between sensor sections 105 and an object).

The robotic device 102 may also include one or more inputs 101, such as a button and/or a microphone. The one or more inputs 101 may be used, for example, to receive commands from a user, such as to indicate a task to be performed, to start the task, to end the task, to indicate the type of task, or to indicate a standard operating procedure for the task. In some cases, the one or more inputs 101 may be used to detect audio inputs associated with a task, e.g., to correctly perform the task, such as detecting a particular sound at a given time stamp (e.g., a component clicking/snapping into a connector). The robotic device 102 may also include one or more outputs 103, such light emitting diode or display.

A controller 106 can utilize a tactile force vector control methodology to combine tactile maps (from sections 105) with a machine learning model to control the robotic device 102 to perform tasks with objects. In some cases, the controller 106 can select the task from a library stored in a data structure 108. For example, the controller 106 can utilize the machine learning model to control movements of the digits 104A-104E, such as to adjust the digits to achieve positions, orientations, and/or applied forces. The controller 106 can control the movements via actuators or motors controlling joint angles of the digits, through successive frames or time stamps, until completion the task.

At each frame or time stamp, measurements 110 of the robotic device 102 may be obtained via sensing performed by sensors of the sections 105. In some implementations, the measurements 110 may include RGB-D (color and depth) images of the robotic device 102 performing the task with the object as obtained by a camera in the robotic environment, such as a scene camera 114A and/or a sensing camera 114B coupled to the robotic device 102. The measurements 110 may be provided to the controller 106, along with target data 112 corresponding to the task that is selected (e.g., a target pose of the demonstration object, or a target image from a camera in the demonstration environment, such as a scene camera 119A and/or a sensing camera 119B coupled to the demonstration device 115). The measurements 110 and the target data 112 may be processed and input to the controller 106 to command next movements of the digits 104A-104E, at next frames or time stamps, in a closed loop control system. The movements may be predicted for each frame or time stamp, and the digits 104A-104E moved accordingly, to achieve force vectors to perform the task.

The system 100 can utilize one or more processors executing instructions stored in memory to perform operations to complete the task. The operations may include determining one or more force measurements corresponding to one or more sections 105. A force measurement may be determined for a section having sensors that are activated (and providing sensor readings) based on contact with an object. A force measurement may include a magnitude of a force and a position of a centroid of the force in a section that are determined based on contact with the object corresponding to a frame or time stamp (e.g., a first frame). The operations may further include determining one or more digit positions of the digits 104A-104E corresponding to the time (e.g., the first frame). In some cases, a digit position may be determined for a digit based on the digit having a section with an activated sensor. For example, some digits might not move in a frame, such as those digits that do not have a section with an activated sensor. In some cases, the operations may further include obtaining one or more images from a camera in the robotic environment, such as the scene camera 114A and/or the sensing camera 114B and/or the sensing camera 114B, corresponding to the time (e.g., the first frame). The measurements 110 may include the one or more force measurements, the one or more digit positions, and/or the one or more images. The operations may further include moving the digits 104A-104E, based on a prediction from the machine learning model, to stabilize the object and move the object to perform the task. The machine learning model can quickly generate the prediction based on the measurements 110 and the target data 112.

A prediction from the machine learning model may include an action to control movements of one or more of the digits 104A-104E to achieve a position, orientation, and/or applied force. To make a prediction, the machine learning model may be trained using historical information, including performance of the task with a demonstration object, performed by a demonstration device 115. For example, the demonstration device 115 may also include a plurality of digits with a sensor array coupled thereto, corresponding to the sensor array coupled to the robotic device 102. The sensor array may include i) tactile sensors arranged in sensor sections 117 coupled to digit sections of digits (e.g., palmar side of digits), and ii) motion sensors 129 coupled to digits of digit sections (e.g., one or more motion sensors per sensor section, arranged dorsal side of digits. Each motion sensor 129 may be kinematically coupled to a global position of the sensor array to enable determining positions of the tactile sensing (e.g., determining 3D positions of 1D forces or 3D force vectors corresponding to contact between sensor sections 117 and an object). The demonstration device 115 may be a sensing glove with digits 116A-116E, corresponding to a thumb and four fingers, having sections 117 of sensors corresponding to the digits and/or sections of the robotic device 102.

The machine learning model can be trained using training data 111 including data samples, such as historical force measurements and digit positions, corresponding to frames or time stamps. The training data 111 can enable the machine learning model to learn patterns, such as temporal patterns that maintain a correlation of input motions (e.g., movements of digits) to measured forces (e.g., force measurements or force profiles) to move digits in contact with an object achieve a static equilibrium of the object. The training data 111 may derive from multiple tasks (e.g., traversing, retrieving, approaching, grasping, withdrawing, orienting, perceiving, manipulating, securing, installing, or inserting) performed with multiple objects (e.g., components, wires, fasteners, tools, etc.). In some cases, the training data 111 may be specific to a single task and/or object (e.g., grasping an electrical connector and installing it in an electrical system). The training data 111 may omit certain data samples that are determined to be outliers, such as extensive motions of the demonstration device 115 and/or training with defective objects. The machine learning model may, for example, be or include one or more of a neural network (e.g., a convolutional neural network (CNN), recurrent neural network (RNN), deep neural network (DNN), or other neural network), decision tree, vector machine, Bayesian network, cluster-based system, genetic algorithm, deep learning system separate from a neural network, or other machine learning model.

The demonstration device 115 may also include one or more inputs 121, such as a button and/or a microphone. The one or more inputs 121 may be used, for example, to receive commands from the user, such as to indicate a start or end of a task, an indication of a type of task, or an input indicating a standard operating procedure for a task. In some cases, the one or more inputs 121 may be used to detect audio input associated with a task. The demonstration device 115 may also include one or more outputs 123, such light emitting diode, display, or haptic feedback. The one or more outputs 123 may be used, for example, to provide feedback to the user.

Figure 2:
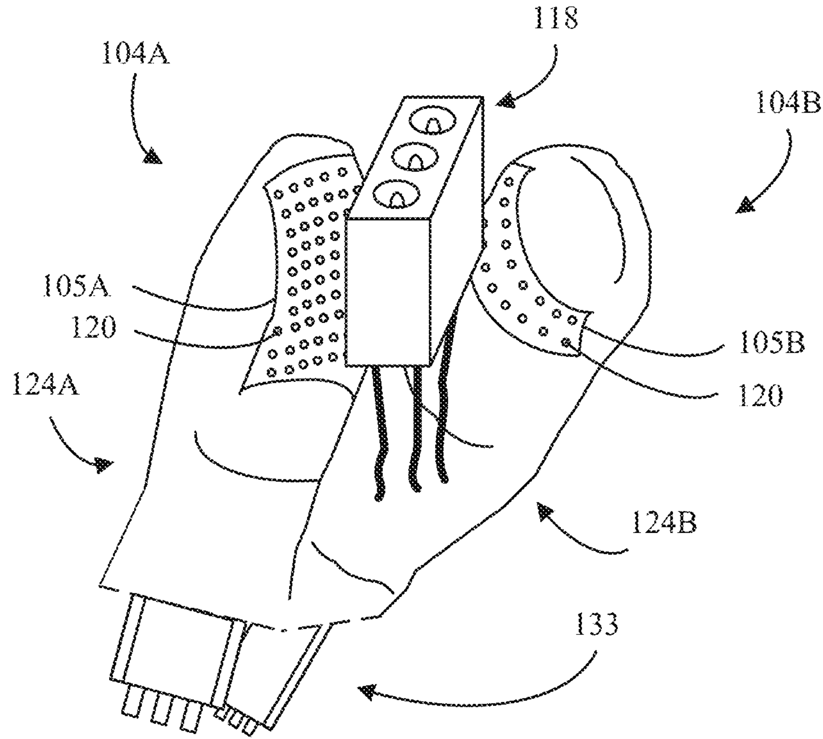
FIG. 2 is an example of digits stabilizing an object to perform a task.
Figure 3:
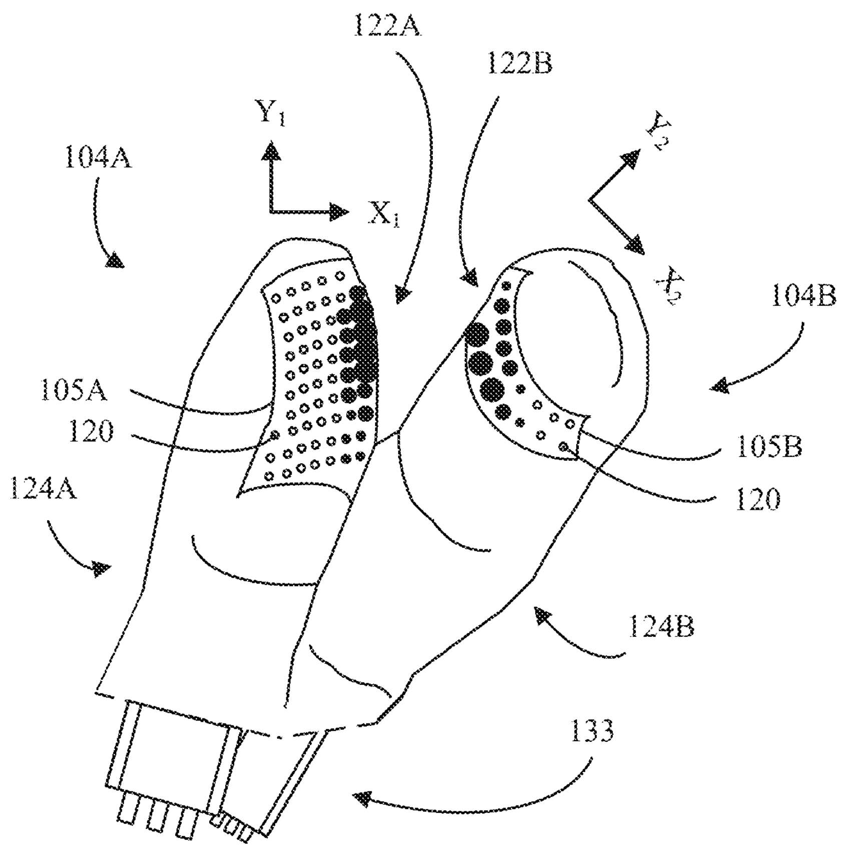
FIG. 3 is an example of force distributions sensed by digits.

FIGS. 2 and 3 illustrate a portion of the robotic device 102, including robotic circuitry 133, utilized by a machine to perform a task with an object 118 (e.g., portions of two digits shown in a robotic environment). With additional reference to FIG. 2, by way of example, digit 104A (e.g., the first digit, a robotic thumb) and digit 104B (e.g., the second digit, a robotic finger) may be controlled to perform a task with an object 118, an electrical connector. For example, the task may include grasping the electrical connector and installing it in an electrical system. The digit 104A and 104B may each include moveable joints, such as joints 124A and 124B of digit 104A and 104B, respectively, controlled by motors or actuators to perform the task. Further, the digits 104A and 104B may each include sections 105 of sensors 120, such as force sensors in tactile arrays. For example, digit 104A may include section 105A, an N1×M1 array of sensors 120, and digit 104B may include section 105B, an N2×M2 array of sensors 120. The controller 106 can receive measurements 110, based on input from the sections 105A and 105B, and target data 112 associated with the task. The controller 106 can then control the digits 104A and 104B, based on predictions from the machine learning model, to stabilize the object 118 and move the object 118 to perform the task.

With additional reference to FIG. 3, based on contact with the object 118, various sensors 120 of the sections 105A and 105B may activate to generate force distributions in the sections, such as force distributions 122A and 122B. These force distributions may each comprise instantaneous distribution of forces, or tactile maps, among sensors 120 of the sections, recorded at a frame or time stamp. Each force distribution may be relative to a local coordinate frame of its corresponding section, such as force distribution 122A relative to (X1, Y1) coordinates of section 105A, and force distribution 122B relative to (X2, Y2) coordinates of section 105B. While exemplified with two-dimensional coordinates, in some cases, each force distribution may be relative to a three-dimensional local coordinate frame (e.g., based on sections wrapped in three-dimensions over a digit). For example, the force distributions may include a force distribution relative to (X1, Y1, Z1) coordinates of section 105A, and force distribution relative to (X2, Y2, Z2) coordinates of section 105B. The force distributions may reflect varying magnitudes and positions of forces at coordinates of activated sensors 120 in the sections. The magnitudes and positions may correspond to the locations and amounts of sensing detected by the sensors 120, which may change from frame to frame.

In some implementations, the sensors 120 may comprise micro-sensors which may be submillimeter in at least one in-plane dimension associated with a footprint, and/or may be arranged at a pitch of 3 millimeters or less (e.g., less than 3 millimeters (mm) between footprints of sensors). The sections may be configured to obtain force data indicating a force applied to the digit at the section (e.g., tactile sensing, via normal force sensors, shear force sensors, and/or other sensing), among other data. Other sensors of the robotic device 102 may be configured to obtain motion data indicating a motion of the digits (e.g., a trajectory, position, orientation, velocity, or acceleration) utilized to determine the digit positions.

Figure 4:
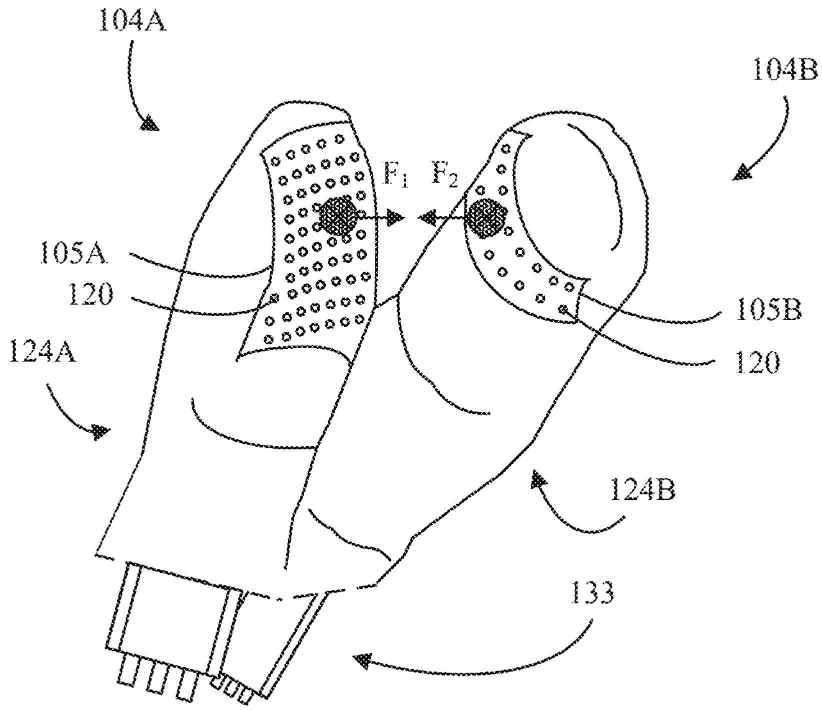
FIG. 4 is an example of force measurements determined for digits.

With additional reference to FIG. 4, based on each force distribution, the system 100 can determine force measurements corresponding to the sections 105 at each frame or time stamp. The force measurements may comprise force vectors that are normal to the sections, indicating normal forces. For example, the system 100 can determine a force measurement comprising force vector F1, corresponding to section 105A, in a first frame or time stamp. The force vector F1 may include a magnitude and a position of a centroid of force that is normal to the section 105A. The system 100 can also determine a force measurement comprising force vector F2, corresponding to section 105B, also at the first frame or time stamp. The force vector F2 may include a magnitude and a position of a centroid of force that is normal to section 105B.

In some implementations, the force measurements may comprise force vectors that are tangential to the sections to indicate a shear force. This may be useful, for example, to detect slipping of the object. For example, the system 100 can determine a force measurement comprising force vector F3, corresponding to section 105A, in the first frame or time stamp. The force vector F3 may include a magnitude and a position of a centroid of force that is tangential to the section 105A. The system 100 can also determine a force measurement comprising force vector F4, corresponding to section 105B, also at the first frame or time stamp. The force vector F4 may include a magnitude and a position of a centroid of force that is tangential to section 105B.

Figure 6A:
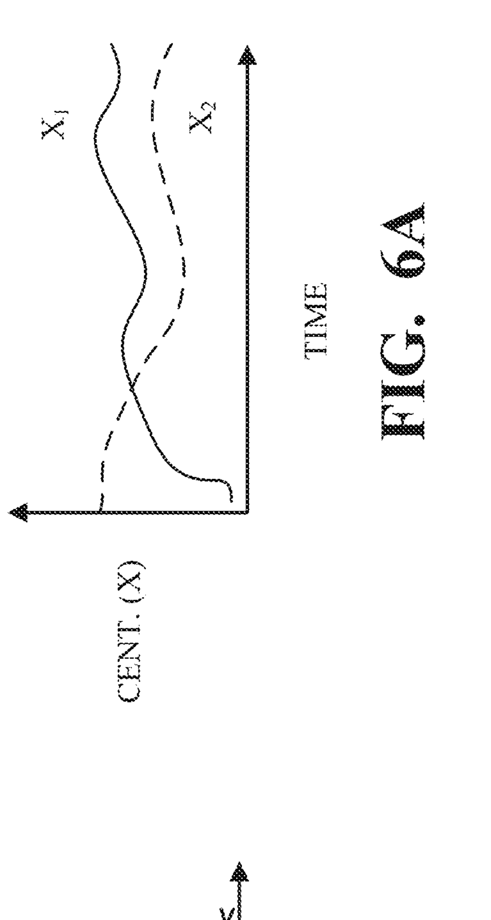
FIG. 6A is an example of X positions of centroids determined for digits.
Figure 7:
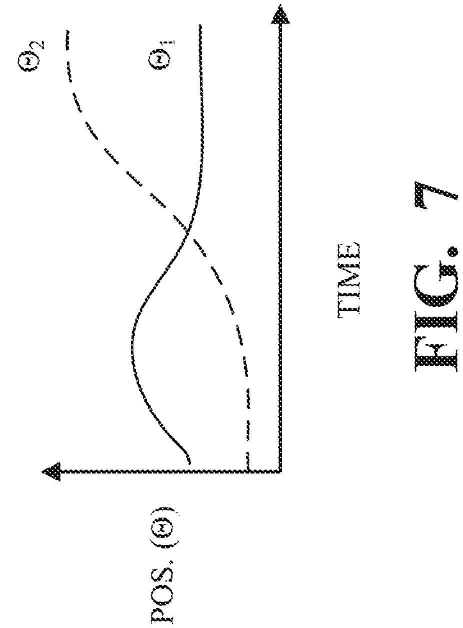
FIG. 7 is an example of digit positions determined for digits.
Figure 5:
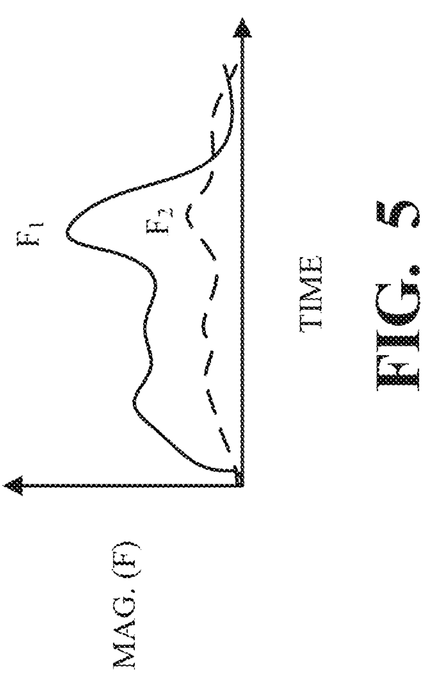
FIG. 5 is an example of magnitudes of forces determined for digits.
Figure 6B:
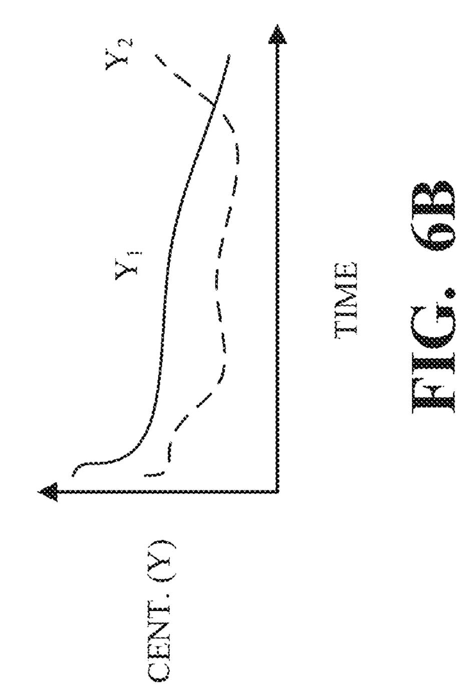
FIG. 6B is an example of Y positions of centroids determined for digits.

The force measurements can vary at each frame or time stamp during performance of the task. For example, FIG. 5 illustrates magnitudes of the forces F1 and F2 applied by digits 104A and 104B, respectively, varying at successive time stamps when performing the task. Similarly, FIG. 6A illustrates X positions of centroids of the forces F1 and F2 varying at corresponding time stamps, and FIG. 6B illustrates Y positions of the centroids of the forces F1 and F2 varying at corresponding time stamps, when performing the task. Additionally, the digit positions can vary at each frame or time stamp during performance of the task. For example, FIG. 7 illustrates digit positions Θ1 and Θ2 (joint angles) of joints 124A and 124B varying at corresponding frames or time stamps when performing the task.

Figure 8:
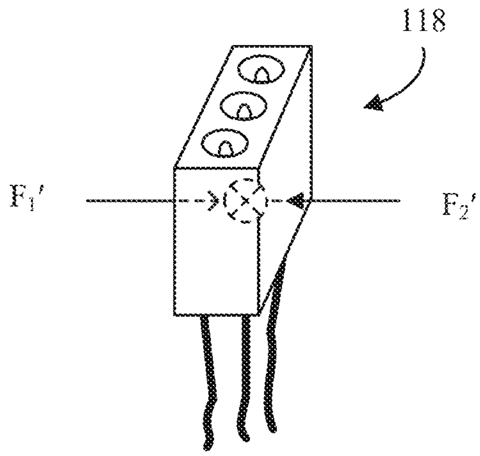
FIG. 8 is an example of maintaining static equilibrium of an object.

The system 100 can move the digits 104A and 104B in time, via the controller 106, controlling the joints 124A and 124B, based on predictions from the machine learning model at each frame or time stamp. The system 100 can move the digits 104A and 104B to stabilize and move the object 118 to perform the task. The machine learning model can generate the predictions based on the force measurements (e.g., processing of F1, F2) and target data for the object 118. With additional reference to FIG. 8, the machine learning model can adjust multiple digits in contact with the object, e.g., the digits 104A and 104B, to maintain a static equilibrium of the object 118, controlling digit positions to achieve forces (F1', F2') acting on the object 118, during performance of the task. The forces (F1', F2') may be calculated to provide equal and opposite forces to maintain the static equilibrium.

Generally, the system 100 may utilize at least two digits to grasp an object, e.g., digits 104A and 104B. In some implementations, the prediction may include adding one or more additional digits of the robotic device 102 to stabilize the object and achieve the. For example, in addition to digits 104A and 104B in the example above, one or more of digits 104C, 104D, and/or 104E (e.g., generally, up to five digits of the robotic device 102) may be further controlled and moved to be in contact with the object, to reinforce the grasp of the object 118, to maintain the equilibrium. Each of the digits in contact with the object 118 may be continuously evaluated and adjusted as necessary based on predictions from frame to frame.

Figure 9:
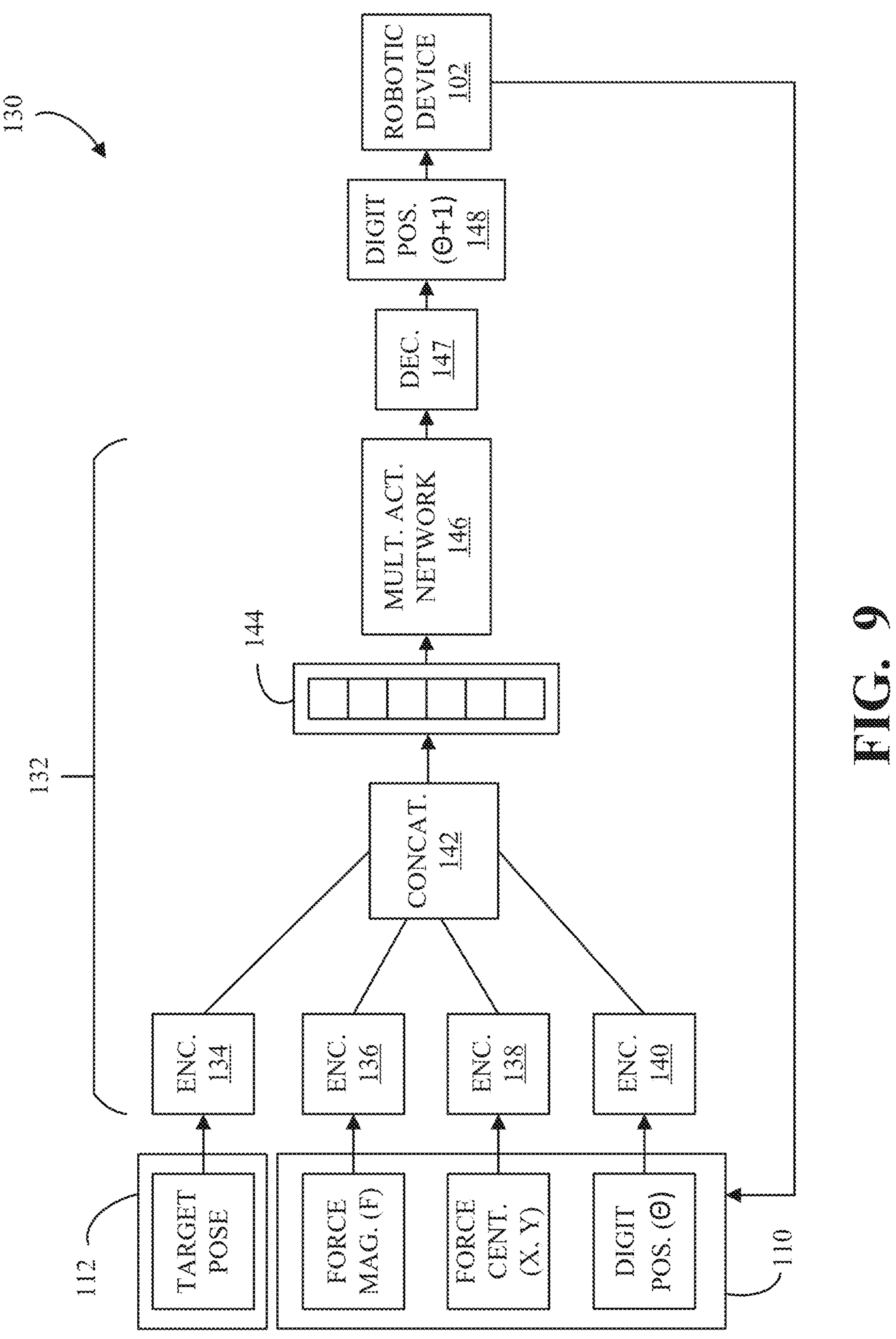
FIG. 9 is a first example of generating predictions to move a digit.

FIG. 9 is an example of a system 130 for generating predictions to move the robotic device 102 to perform tasks. The system 130 can utilize a machine learning model 132 which may be implemented by the controller 106. The prediction can enable moving one or more digits relative to one or more other digits (e.g., robotic thumb/fingers) based on contact with an object, such as the object 118. The prediction can enable moving the digits in contact with the object to achieve a static equilibrium of the object, such as F1', F2', described above with respect to FIG. 8. The machine learning model 132 can generate the prediction based on force measurements and digit positions, corresponding to a plurality of times of a sampling frequency (e.g., 60 Hz), and the target data associated with the task.

For example, after selecting a task from a library, the machine learning model 132 can receive target data 112 corresponding to the task. The target data 112 may include a target pose of the object upon completing the task (e.g., a desired object pose), such as insertion of the electrical connector upright in a socket of the electrical system. For example, the target pose may be specified in terms of cartesian positions, Euler angles (e.g., pitch, roll, and yaw), and/or quaternions (e.g., x (t+h), y (t+h), z (t+h)), of the object at a future time (t+h). The target data 112 may be generated by demonstrating the task with the demonstration device 115 (e.g., sensing glove including digits 116A-116E with sections 117 of sensors 120) and the demonstration object (e.g., the object 118 or another), and storing the cartesian positions, Euler angles, and/or quaternions in the data structure 108. The target data 112 may result in a target pose data set which can remain fixed for the duration of the task.

The machine learning model 132 can receive measurements 110 from an initial point in time (t−k) and at successive frames or time stamps during performance of the task (e.g., from t−k, to t−0). The machine learning model 132 can receive the measurements 110 from sections with detected activations of sensors 120 in a frame or time stamp (e.g., non-zero readings), and for digits corresponding to those sections. The measurements 110 may include force measurements corresponding to a time (t) and digit positions (O, indicating joint angles), of digits with sections having the force measurement, corresponding to the time (t). A single force measurement may include a magnitude of a force (F) and a position of a centroid of the force (X, Y coordinates) normalized in a section in two dimensions. The section may be wrapped in over a digit, such as around a robotic fingertip or thumb tip, and in some cases, may include a magnitude of a force (F) and a position of a centroid of the force (X, Y, Z coordinates) normalized in the section in three dimensions. The measurements 110 may result in compressed data sets, including a magnitude data set (F(t)), a centroid data set (X(t), Y(t)), and a digit position data set (Θ (t)) obtained at each frame or time stamp (as opposed to magnitudes and locations of forces at every point of sensing).

The machine learning model 132 can then utilize encoders to extract features from the compressed data sets and from the target data to produce reduced vector data representations from each data set (represented by an array of numbers between 0 and 1). For example, encoder 134 (e.g., a position encoder) may be tuned to extract features from the target pose data set to produce a target pose vector data representation, encoder 136 (e.g., a force encoder) may be tuned to extract features from the magnitude data set to produce a magnitude vector data representation, encoder 138 (e.g., an image encoder) may be tuned to extract features from the centroid data set to produce a centroid vector data representation, and encoder 140 (e.g., a position encoder) may be tuned to extract features from the digit position data set to produce a digit position vector data representation. For example, the encoders may each comprise a CNN tuned via hyperparameters. In some cases, one or more of the encoders may utilize a predefined image encoder (e.g., the encoder 138).

The machine learning model 132 can then utilize a concatenator 142 to merge the vector data representations generated by the encoders into a single, unified vector representation, such as vector 144 (represented by another array of numbers between 0 and 1). The vector 144 may be a relatively larger vector (as compared to the output of the encoders). The vector 144 may be a concatenation of features extracted from the force measurements, digit positions, and target data.

The machine learning model 132 can then utilize a multilayer activation network 146 to generate predictions (inferences) based on the vector 144. For example, the multilayer activation network 146 may include an activation layer and a fully connected layer. The multilayer activation network 146 may be tuned based on hyperparameters to generate the predictions based on training (e.g., the training data 111). A prediction may include an action to control movement of a digit to achieve a position, orientation, and/or applied force.

The machine learning model 132 can then utilize a decoder 147 to generate next digit positions 148 to achieve a position, orientation, and/or applied force (e.g., Θ (t+1)) of the digits 104A-104E, based on the predictions. This may enable the digits 104A-104E to be moved, via actuators or motors of the robotic device 102, to stabilize the object and move the object to perform the task and achieve the target pose of the object. As a result, the robotic device 102 can perform fine detailed tasks with objects quickly and efficiently.

Figure 10:
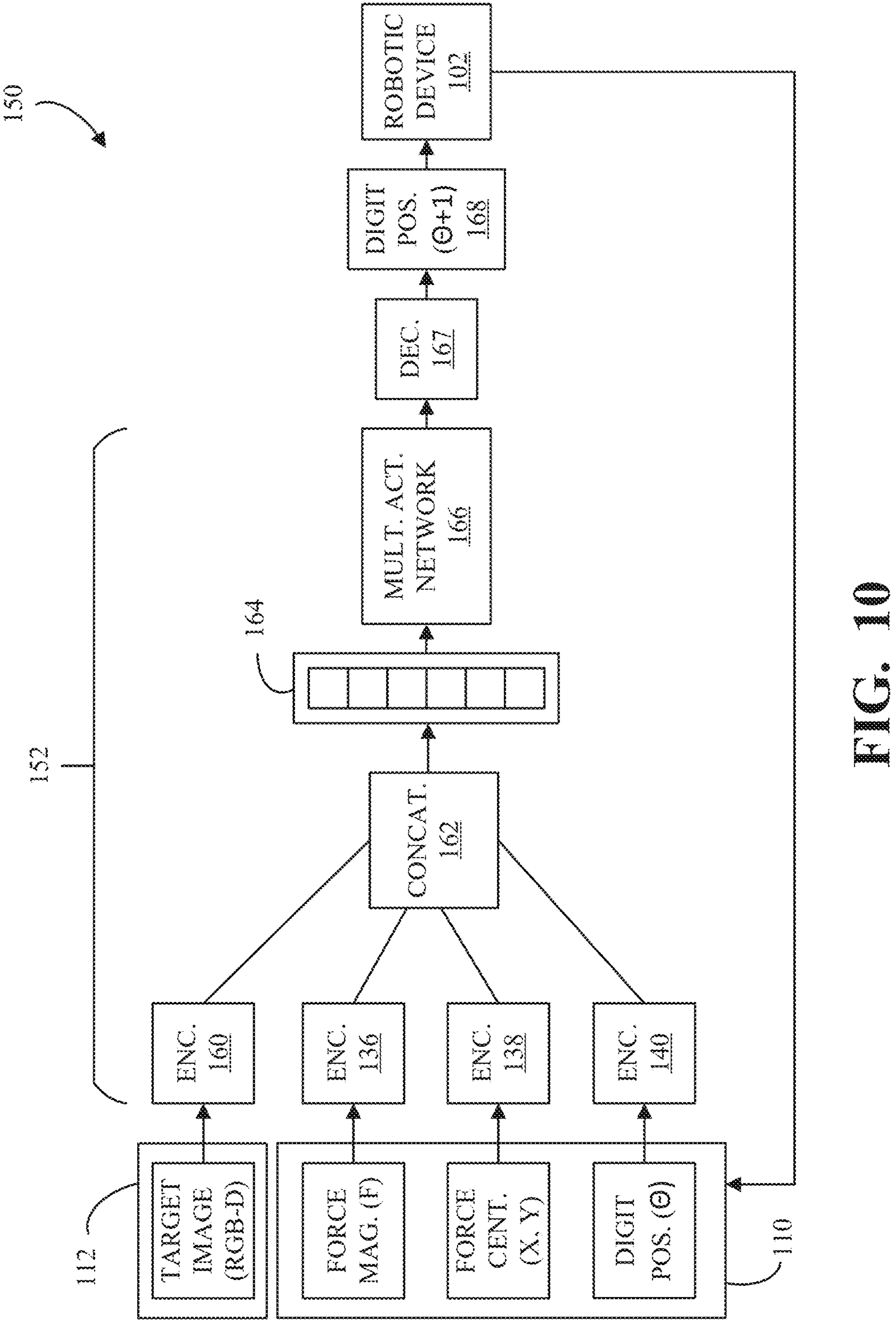
FIG. 10 is a second example of generating predictions to move a digit.

FIG. 10 is an example of a system 150 for generating predictions to move the robotic device 102 to perform tasks. The system 150 can utilize a machine learning model 152 which may be implemented by the controller 106. Like the system 130, a prediction in the system 150 may enable moving one or more digits relative to one or more other digits (e.g., robotic thumb/fingers) based on contact with an object, such as the object 118. Here, the machine learning model 132 can generate the prediction based on target image data.

In the system 150, the machine learning model 152 can receive target data 112 corresponding to an RGB-D target image of the object 118 upon completing a task (e.g., via the scene camera 119A and/or the sensing camera 119B). For example, the target image may include color and depth information mapped to the object 118 (e.g., a desired object image, such as color and depth of the electrical connector inserted and upright in a socket of the electrical system). The target image may be expressed in terms of a color and depth map at a future time (e.g., RGB (t+h), D (t+h)). The target image may be generated by demonstrating the task with the demonstration device 115 and the demonstration object, capturing the color and depth map via camera (e.g., the scene camera 119A and/or the sensing camera 119B), and storing the color and depth map in the data structure 108. The target data 112 may result in a target image data set which can remain fixed for the duration of the task.

The machine learning model 152 can then utilize encoders to extract features from the compressed data sets and from the target data to produce reduced vector data representations from each data set. For example, an encoder 160 (e.g., an image encoder) may be tuned to extract features from the target image data set to produce a target image vector data representation, along with other encoders to extract features from other data sets. In some implementations, the encoder 160 may comprise a CNN tuned via hyperparameters.

The machine learning model 152 can then utilize a concatenator 162 to merge the vector data representations generated by the encoders into a unified vector representation, such as vector 164. The vector 164 may be a concatenation of features extracted from the force measurements, digit positions, and target data. The machine learning model 152 can then utilize a multilayer activation network 166 to generate predictions (inferences) based on the vector 164. For example, the multilayer activation network 166 may include a multilayer linear and activation block. The multilayer activation network 166 may be tuned based on hyperparameters to generate the predictions based on the training (e.g., the training data 111). The machine learning model 152 can then utilize a decoder 167 to generate next digit positions 168 (e.g., (e.g., to achieve a position, orientation, and/or applied force, via Θ (t+1)) based on the predictions to control the digits 104A-104E. The digits 104A-104E can be moved, via actuators or motors of the robotic device 102, to stabilize the object and move the object to perform the task and achieve the target image of the object. As a result, the robotic device 102 can perform the fine detailed task with the object quickly and efficiently based on imaging.

In some implementations, the system 100 can utilize a determined decrease of force in a frame or time stamp of a section to detect slip of an object in contact with a digit (e.g., a decrease of force to maintain the static equilibrium of the object). For example, the controller 106 can determine that a decrease of force may be occurring in a subsequent frame or time stamp of sections 105A and/or 105B. The controller 106 can detect that the object 118 is slipping from the grasp of digits 104A and 104B based on the determined decrease of force. Responsive to the slipping, the controller 106 can adjust one or more digits to provide the grasp in a next frame or time stamp, such as by moving the digits 104A and 104B (joint angles) to incrementally increase the force at sections 105A and/or 105B and strengthen the grasp.

Reference is now made to flowcharts of examples of processes for controlling robotic devices to perform tasks. The processes can be executed using computing devices, such as the systems, hardware, and software described with respect to FIGS. 1-10. The processes can be performed, for example, by executing a machine-readable program or other computer-executable instructions, such as routines, instructions, programs, or other code. The operations of the processes or other techniques, methods, or algorithms described in connection with the implementations disclosed herein can be implemented directly in hardware, firmware, software executed by hardware, circuitry, or a combination thereof.

For simplicity of explanation, the processes are depicted and described herein as a series of operations. However, the operations in accordance with this disclosure can occur in various orders and/or concurrently. Additionally, other operations not presented and described herein may be used. Furthermore, not all illustrated operations may be required to implement a process in accordance with the disclosed subject matter.

Figure 11:
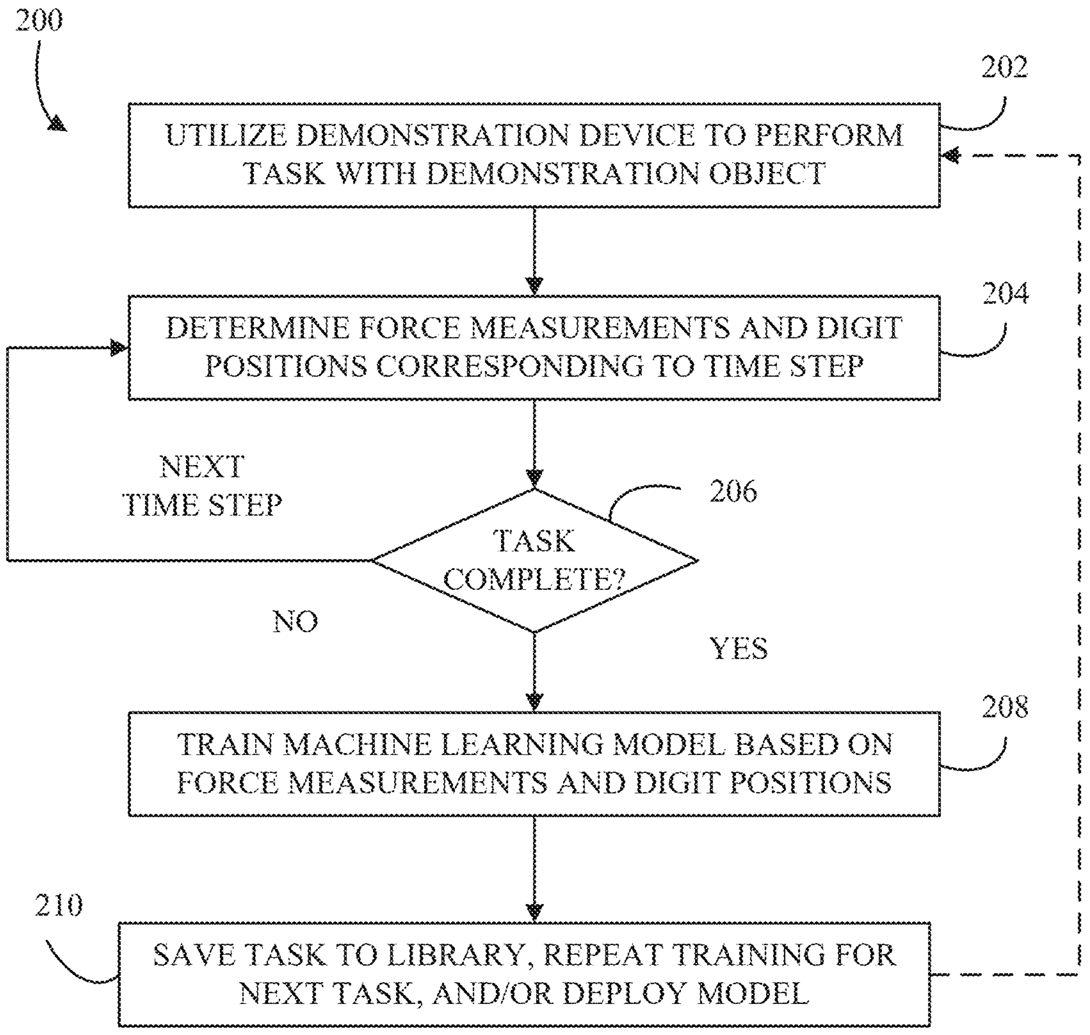
FIG. 11 is an example of a process for training a machine learning model to control robotic devices to perform tasks.

FIG. 11 is an example of a process 200 for training a machine learning model to control robotic devices to perform tasks. For example, the process 200 may be used to train the machine learning model 132 or the machine learning model 152. At operation 202, a system can utilize a demonstration device to perform a task with an object. For example, the system 100 can utilize the demonstration device 115 to perform the task of grasping the object 118 (e.g., an electrical connector) and installing it in an electrical system. This may include a user wearing the demonstration device 115 (e.g., a sensing glove) and/or giving a command indicating a start of the task, such as via the one or more inputs 121 (e.g., the microphone). In some cases, the user may give the command via a first predefined hand gesture detected by the motion sensors. The system can receive the command from the user indicating a start of the task. The task may be performed through a plurality of frames or time stamps (e.g., 60 Hz).

At operation 204, the system can determine force measurements and digit positions corresponding to a frame or time stamp. For example, the system can determine force measurements comprising force vectors (e.g., F1, F2) and digit positions comprising joint angles (e.g., Θ1 and Θ2) corresponding to a frame or time stamp.

At operation 206, the system can determine whether the task is complete (e.g., the object 118 installed in the electrical system). In some cases, the system can determine that the task has ended by receiving a command from the user indicating the end of the task. For example, the user may give a command to end the task via the one or more inputs 121 (e.g., the microphone). In some cases, the user may give the command to end the task via a second predefined hand gesture detected by the motion sensors. If the task is not complete (No), the system can return to operation 202 to continue performance of the task in a next frame or time stamp, and operation 204 to determine force measurements and digit positions corresponding to the next frame or time stamp. However, at operation 206 if the task is complete (Yes), at operation 208, the system can finalize training of the machine learning model to generate predictions, based on the force measurements and digit positions, to perform the task. Then, at operation 210 the system can save the task to a library, repeat the process of training the machine learning model for a next task, and/or deploy the machine learning model to a control system (e.g., the controller 106). In some implementations, the machine learning model may be trained based on force measurements from a sensor section of sensors coupled with a digit of a plurality of digits of a sensing glove utilized to perform the task with a demonstration object. In some implementations, the machine learning model may be trained to predict movements of a digit to maintain a correlation between movements of the digit and a plurality of force measurements. In some implementations, the system may include a camera, and the machine learning model may utilize an image from the camera to determine the digit position. In some implementations, the object may be an electrical connector, and the task may include grasping the electrical connector and installing it in an electrical system.

Figure 12:
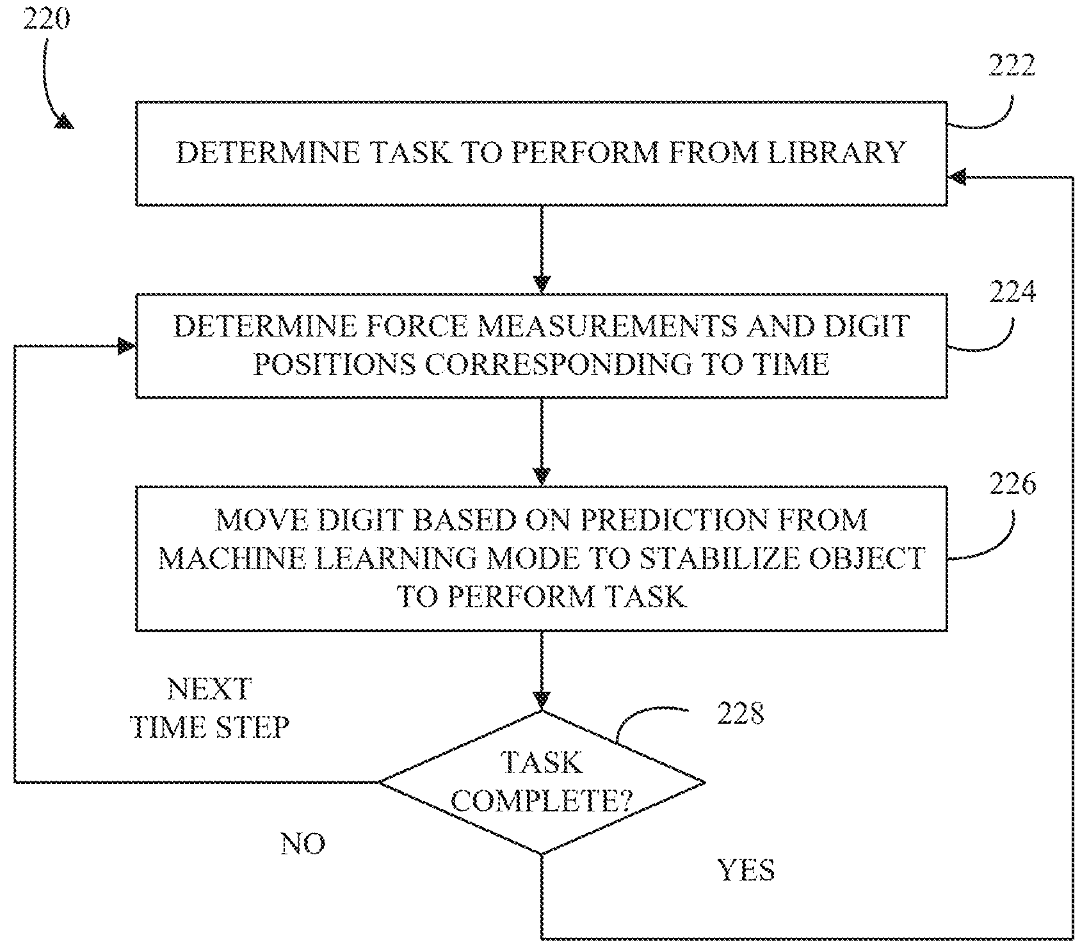
FIG. 12 is an example of a process for utilizing a machine learning model to control robotic devices to perform tasks.

FIG. 12 is an example of a process 220 for utilizing a machine learning model to control robotic devices to perform tasks. For example, the system 100 can utilize the machine learning model 132 or the machine learning model 152, based on the process 220, to control the robotic device 102 to perform a task with an object.

At operation 222, a system can determine a task to perform from a library. For example, the system 100 can determine the task to be grasping the object 118 (e.g., an electrical connector) and installing it in an electrical system. In some cases, the system may receive a command that indicates the task to perform, such as via the one or more inputs 101 (e.g., the microphone).

At operation 224, the system can begin to perform the task, including by obtaining force measurements and digit positions corresponding to a frame or time stamp. For example, the system can obtain force measurements comprising force vectors (e.g., F1, F2) and digit positions comprising joint angles (e.g., 01 and 02) corresponding to a frame or time stamp.

At operation 226, the system can move digits of the robotic device, based on a prediction, to stabilize and move the object in a next frame or time stamp to perform the task. The system can use a machine learning model to generate the prediction based on the force measurements and the digit positions from operation 224. For example, the system 100 can move one or more of digits 104A-104E to achieve positions, orientations, and/or applied forces, including via joint angles, to stabilize and move the object in the next frame or time stamp.

At operation 228, the system can determine whether the task is complete. For example, the system 100 can utilize target data (e.g., a target pose or image) to determine whether the task is complete. If the task is not complete (No), the system can return to operation 224 to obtain force measurements and digit positions corresponding to a next frame or time stamp, and operation 226 to the digits of the robotic device, based on a next prediction, to stabilize and move the object in a next frame or time stamp. However, at operation 228 if the task is complete (Yes), the system can return to operation 222 to determine a next task to perform, which could be the same task or a different task determined from the library. Multiple digits 104 of the robotic device 102 can be controlled in this way at the same time to grasp on object and complete a task.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function.

In utilizing the various aspects of the embodiments, it would become apparent to one skilled in the art that combinations or variations of the above embodiments are possible for multimodal charge based sensing. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A method for controlling a robotic device to perform a task, comprising:

determining a force measurement corresponding to a section of sensors coupled with a digit of a plurality of digits of a robotic device, wherein the force measurement includes a magnitude of a force and a position of a centroid of the force in the section that are determined based on contact with an object corresponding to a time;

determining a digit position of the digit corresponding to the time; and moving the digit, based on a prediction, to stabilize the object to perform a task, wherein a machine learning model generates the prediction based on the force measurement and the digit position.

2. The method of claim 1, wherein the machine learning model is trained based on force measurements from a section of sensors coupled with a digit of a demonstration device utilized to perform the task with a demonstration object.

3. The method of claim 1, wherein the machine learning model comprises a plurality of encoders, an activation layer, a fully connected layer, and a decoder.

4. The method of claim 1, wherein the machine learning model operates on a vector comprising a concatenation of features extracted from force measurements, digit positions, and target data.

5. The method of claim 1, wherein the prediction moves multiple digits of the plurality of digits in contact with the object to achieve an equilibrium of the object.

6. The method of claim 1, wherein the digit is a robotic thumb, and wherein the prediction moves a robotic finger having a section of sensors and the robotic thumb in contact with the object to achieve an equilibrium of the object.

7. The method of claim 1, wherein the machine learning model generates the prediction based on force measurements and digit positions corresponding to a plurality of times determined by a sampling frequency.

8. The method of claim 1, wherein the machine learning model generates the prediction based on a plurality of force measurements and a plurality of digit positions corresponding to a plurality of digits in contact with the object.

9. The method of claim 1, wherein the digit is a robotic finger or thumb having at least one section of force sensors.

10. The method of claim 1, wherein the section is wrapped in three dimensions over the digit, and wherein the position of the centroid includes X, Y, Z coordinates.

11. The method of claim 1, wherein the force measurement comprises a force vector that is normal to the section to indicate a normal force.

12. The method of claim 1, wherein the force measurement comprises a force vector that is tangential to the section to indicate a shear force.

13. The method of claim 1, further comprising:

utilizing a decrease of force in a frame of the section to detect slip of the object in contact with the digit.

14. The method of claim 1, wherein the digit position comprises one or more angles corresponding to one or more joints of the digit.

15. The method of claim 1, wherein the magnitude of the force and the position of the centroid are determined based on an instantaneous distribution of forces among sensors of the section.

16. The method of claim 1, wherein the position of the centroid is determined based on a local coordinate frame of the section.

17. The method of claim 1, wherein the digit is moved to achieve a target pose of the object specified by at least one of cartesian positions, Euler angles, or quaternions.

18. The method of claim 1, wherein the digit is moved to achieve a target image of the object comprising an RGB-D image.

19. The method of claim 1, wherein the digit is moved to achieve a target force profile comprising an array of force vectors or a single force vector and a corresponding centroid location.

20. A system utilized to perform a task with an object, comprising:

a robotic device having a plurality of digits, each digit having a section of sensors; and one or more processors executing instructions stored in memory to:

determine a force measurement corresponding to a section of a digit of the plurality of digits, wherein the force measurement includes a magnitude of a force and a position of a centroid of the force in the section that are determined based on contact with an object corresponding to a time;

determine a digit position of the digit corresponding to the time; and move the digit, based on a prediction, to stabilize the object to perform a task, wherein a machine learning model generates the prediction based on the force measurement and the digit position.

* * * * *